March 25, 1930. J. P. TARBOX 1,752,119
BALANCING SYSTEM FOR AIRCRAFT
Filed Nov. 4, 1927   3 Sheets-Sheet 3
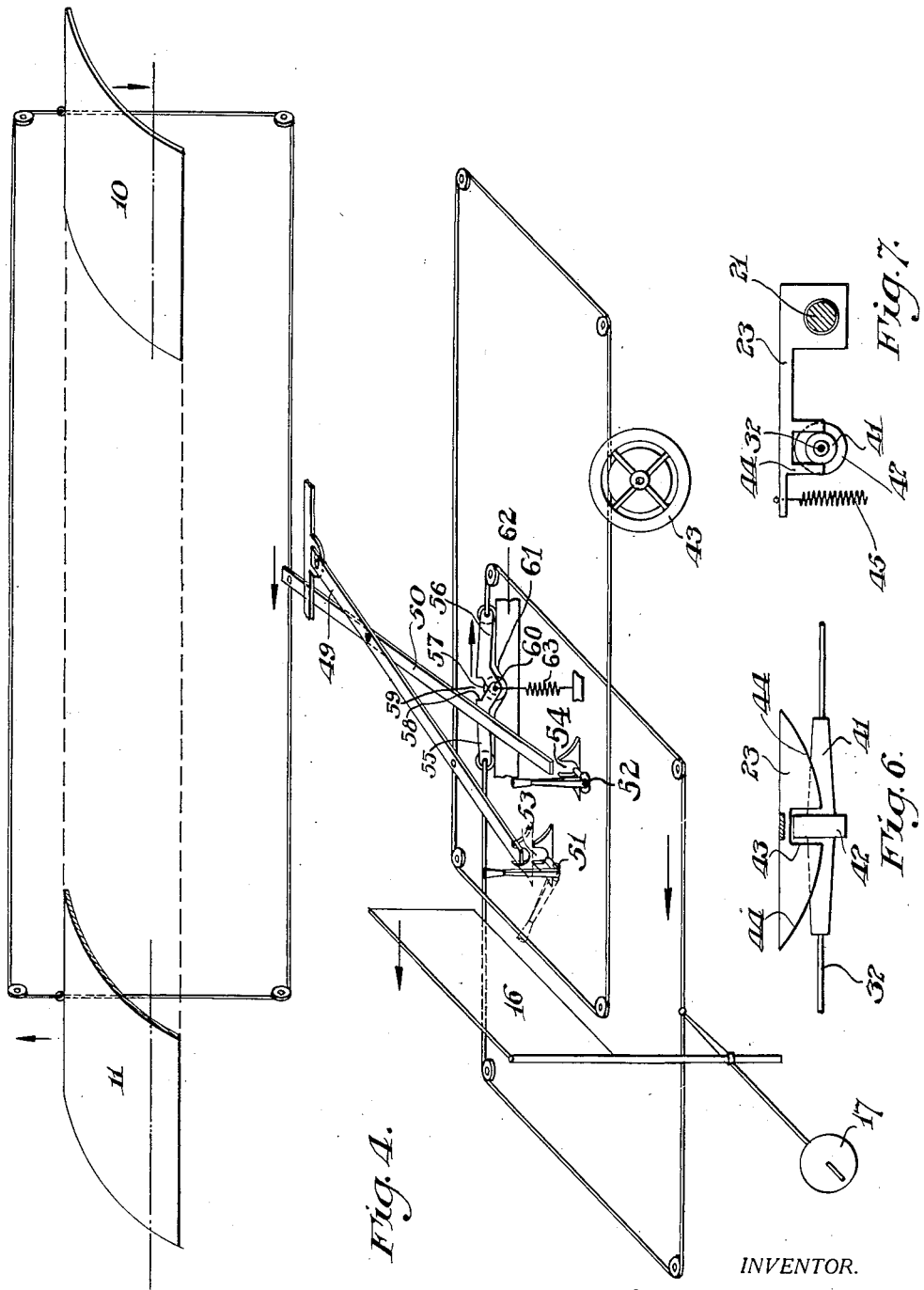
INVENTOR.

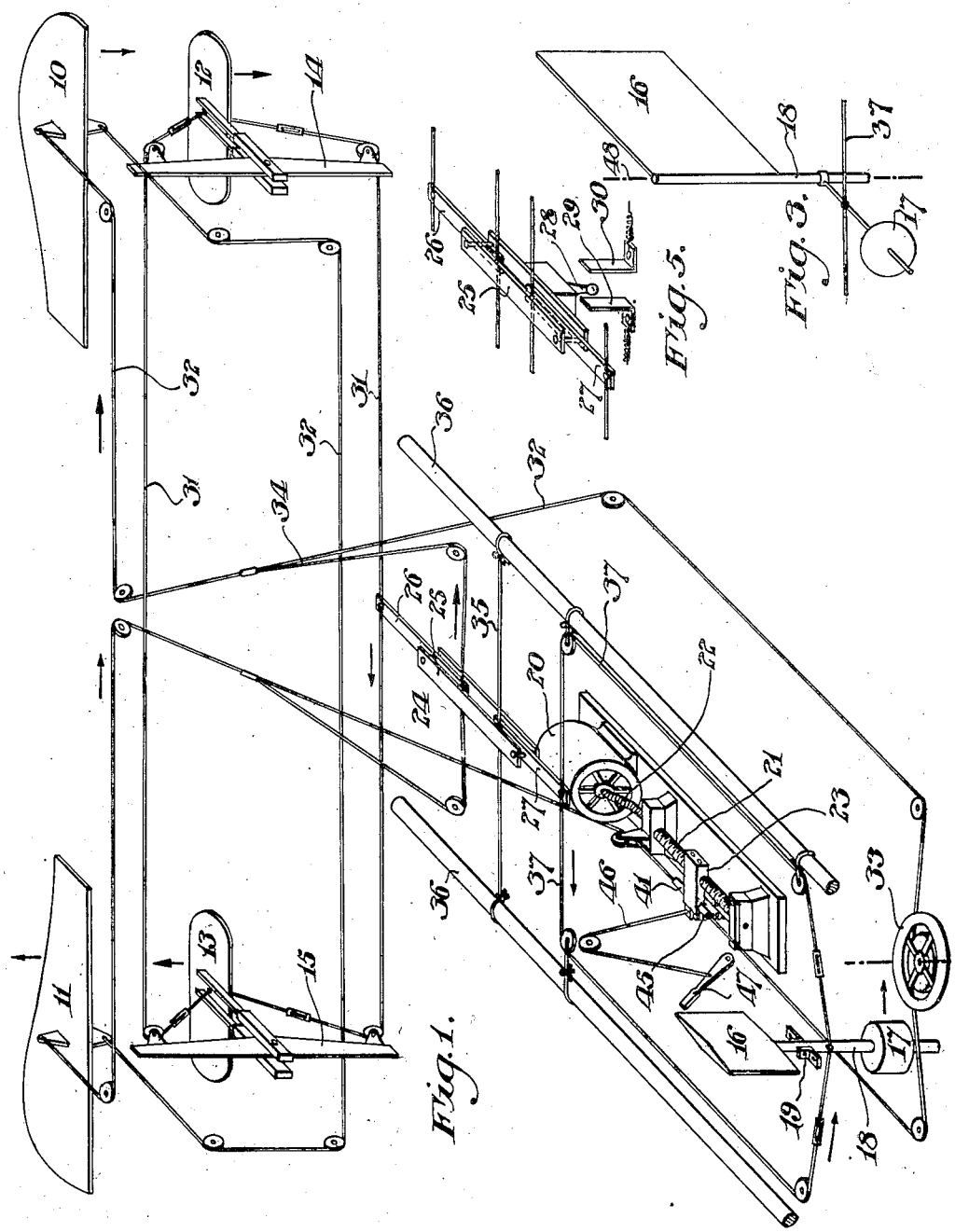

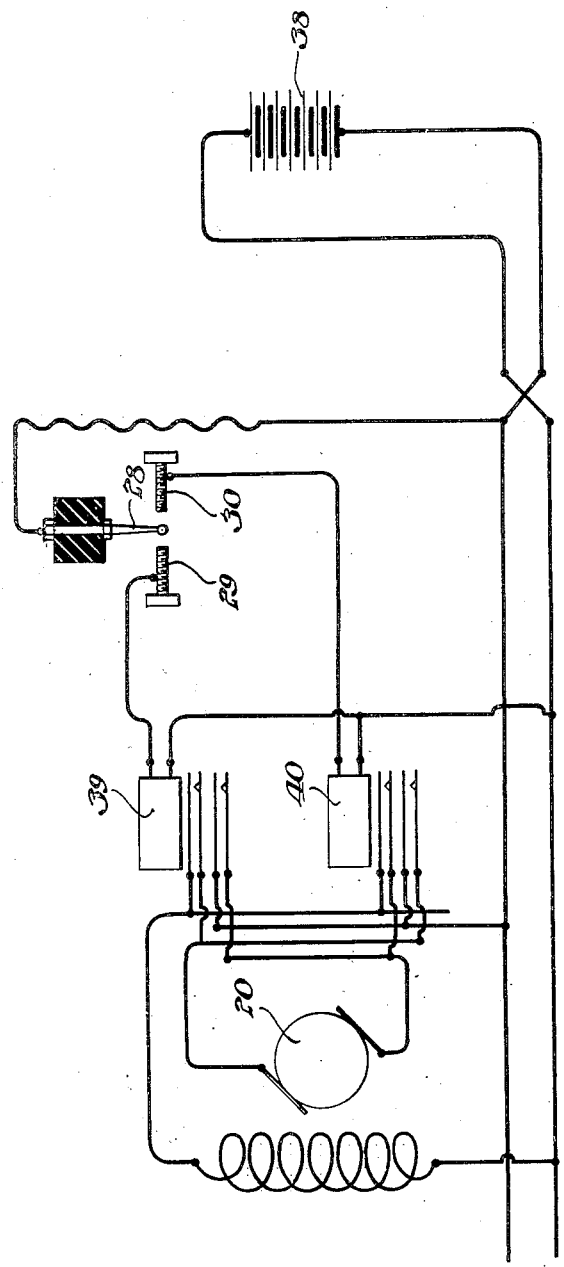

Patented Mar. 25, 1930

1,752,119

UNITED STATES PATENT OFFICE

JOHN P. TARBOX, OF PHILADELPHIA, PENNSYLVANIA, ASSIGNOR TO TARBOX SAFETY AIRCRAFT COMPANY, OF WILMINGTON, DELAWARE, A CORPORATION OF DELAWARE

BALANCING SYSTEM FOR AIRCRAFT

Application filed November 4, 1927. Serial No. 230,956.

This balancing system of my invention is an improvement of my Patent No. 1,644,758, granted Oct. 11, 1927.

The prime object of the invention is to improve the rapidity of the response of the system to air rush and other disturbances. This improvement in rapidity is not only general throughout the system but also and particularly in promptness of response to disturbances.

I have discovered that the inertia of the system at large has a great deal to do with the promptness of the response, particularly the inertia of the control or pilot devices. According to my present invention, therefore, I sub-divide this enertia into several component parts, individually effective in bringing about a response.

The lateral balancing system to which this invention is more particularly applicable comprises laterally spaced pilot ailerons or equivalent pressure responsive devices and in addition thereto devices responsive to sideslipping or skidding and change of position with respect to the earth. According to my invention I differentially connect the pilot ailerons and the other devices and cause them to effect the control through the differential connection whereby either group of devices may independently effect the control.

Other advantages of my invention will appear and modifications thereof become apparent as the details are understood.

Of the drawings which but diagrammatically show and illustrate the invention—

Figure 1 is a perspective view of the system embodying pilot control devices and a servo motor;

Figure 2 is a diagram of electrical connections pertaining to the servo motor and the differential control thereof;

Figure 3 is a modified form of those pilot control elements responding to skidding and side slipping and to change in position with respect to earth, and Figure 4 is a diagrammatic perspective of the invention as applied directly to aileron control surfaces independently of pivot devices and servo motor.

Figure 5 is a perspective of the differential used in Fig. 1.

Figs. 6 and 7 are front elevation and transverse sections respectively of the coupling of Fig. 1 between servo motor and aileron cable.

Referring first to Figure 1, 10 and 11 represent the ailerons of a standard aeroplane, 12—13 represent corresponding pilot ailerons indicated as pivotally mounted on transverse axes carried by outer struts 14—15. 16 is a vane in a longitudinal vertical plane and 17 is a weight. These two devices are mounted on a common rod 18 pivoted on a longitudinally extending axis 19 to swing in a transverse plane. Vane 16 lies in the air rush and is responsive to side slipping and skidding to move rod 18 about its axis. Likewise gravity acting on weight 17 similarly moves rod 18 when the position of the craft changes with respect to earth.

20 is an electrical servo motor, 21 is a screw mounted in suitable bearings and driven by this motor through a flexible drive 22 and 23 is a nut reciprocated by screw 21 according as it is driven in one direction or another by the motor 20.

24 applies to the differential at large between these two groups of elements. This differential is of the lever type. It includes three levers, a central lever 25, and two end levers, one 26 and one 27, pivoted centrally of their lengths to opposite ends of lever 25. Lever 25 carries centrally of its length an insulated contact 28 coacting with relatively fixed contacts 29, 30 in such manner that when lever 25 is moved in one direction, contact 28 makes circuit through contact 29 and when moved in the opposite direction, makes circuit through contact 30.

The pilot ailerons 12—13 are connected together for differential operation, the one up when the other goes down through cable 31. The lower branch of this cable is connected to one end of lever 26. The regular ailerons 10 and 11 are connected together for differential operation the one up when the other goes down by means of cable 32. The upper branch of this cable 32 extends down into the body of the machine and forwardly to a manual control wheel 33, by means of which the ailerons 10—11 can be operated manually. A branch loop 34 from cable 32 is connected at the opposite end of lever 26 from the cable 31. One end of lever 27 is fixed in position by tying in through cable 35 to the longérons 36 of the body of the craft or to other fixed support. The other end of lever 27 is connected to cable circuit 37 supported from longérons 36 and connected with the rod 18 which supports the vane 16 and the weight 17.

The arrangement of the connections is such if the cable systems 31 and 37 are operated in the direction of the applied arrows, levers 26—27 coact on lever 25 to close the left hand contact 29. Under these conditions the resultant movement of the ailerons 10—11 is in the direction shown by the applied arrow, and loop 34 is drawn in a direction therefore to oppositely move lever 26 and open the contacts closed through cable system 31 and/or 37. Under opposite movements of cable systems 31 and 37, contact 28 is closed against the right hand contact 30 and the resulting movement of cable system 32 and the connected ailerons 10 is such as to open this oppositely closed contact. Connection of the cable loop 34 with the cable 32 is in other words what is commonly known as a follow up connection.

Referring now to Fig. 2 in which is shown the diagram of electrical connections, the contacts 28, 29 and 30 clearly appear. Contacts 29—30 are connected to control the application of battery 38 respectively to the reversing relays 39 and 40. These reversing relays control the direction of rotation—clockwise or counterclockwise—of the servo motor 20 whereby when 28 contacts with 29, the motor is caused to rotate in one direction and when it contacts with 30, it is caused to rotate in the opposite direction. These circuits are simple and of an order well known in the art and need no further explanation.

So long as it is desired that the control be automatic and through the servo motor 20 block 23, referring again to Fig. 1, is permitted to remain connected with cable 32 as shown in Fig. 1. This connection is shown in detail in Figs. 6 and 7. A sleeve 41 secured in any suitable manner to the body of cable 32 is provided with an enlargement 42 fitting into slot 43 in block 23 on either side of which are provided inclined approaches 44. Engagement is maintained by the tension spring 45 drawing the block normally downwardly. Whenever it is desired to remove the ailerons from the servo motor and automatic control, the block 23 is lifted from sleeve 41 by means of cable connection 46 with the lever 47. The ailerons 10 and 11 may thereupon be operated manually with all the freedom of the standard manually operated systems.

A modification of the vane 16 and weight 17 is shown in Fig. 3. This modification operates about a vertical axis 48 instead of a horizontal axis as in the form shown in Fig. 1. Vane 16 trails like a flag. Vane 17 is located on the opposite or forward side of the axis 18. This may be substituted for the arrangement shown in Fig. 1, the cable system 37 being connected to the arm supporting weight 17.

In Fig. 4 is shown a modified system in which the ailerons 10 and 11 are embodied as portions of the ends of an aeroplane wing and in which vertical vane 16 and mass 17 are of the form shown in Fig. 3. The servo motor and its associated mechanisms are omitted and these devices 10—11, 16—17 are connected together through the simple scissors type differential comprising the pair of crossed levers 49—50. One end of lever 49 is fixed. The other end is connected to the manual control wheel 43. Levers 51 and 52 are respectively provided with lock out slots 53—54 provided with inclined approaches whereby the ends of levers 49—50 may be engaged and either locked out of operation whereby manual control may be exercised independently of the devices 16—17—18. Inclined approaches to the slots 54—53 permit ratcheting of the ends of the levers into the slots in the same manner as does the inclined approach 44 of the nut 23 permit ratcheting of the enlargement 42 into slot 43.

The connection of the lever 50 with cable 37 of the devices 16—17, however, is by means of a normally dis-engaged coupling device comprising a pair of links 55—56 pivoted together at 57 having shoulders 58 together forming slot 59 adapted to receive the end of lever 50 when the links are raised. These levers are connected at their opposite ends to cable 37 and thereby adapted to be moved back and forth by the cable, and provided with a cam roller 60 engaging in cam slot 61 of fixed cam 62 under the bias of spring 63 when devices 16—17 are in their normal positions. Whenever devices 16 and 17 are deflected from normal positions, links 55—56 are moved lateraly of cam slot 60 so as to engage lever 50 in the slot 58 and thereby couple devices 16 and 17 and devices 10 and 11 together. Normally, however, they are free of each other. Therefore, devices 10 and 11 act promptly and rapidly, influenced by their own inertia only in response to lateral disturbances and lever 50 leaves the region of slot 59. If, however, gravity and air rush forces act on devices 16 and 17, device 55 and 56 follows lever 50, overtakes it and the end of lever 50 ratchets up the incline of that one of the links which first approaches it and drops into slot 59 whereupon devices 16 and 17 add their control effects to those or exerted by devices 10 and 11. The coupling remains made until all the control elements have returned to normal position whereupon roller 60 re-enters slot 61 and the control devices are again uncoupled.

Clearly in each, the form of my invention shown in Fig. 1, the servo motor embodiment, and the form shown in Fig. 4, the direct association embodiment, the aileron control is influenced by its own inertia and entirely independent of the vane and mass control 16—17—18. Similarly, the vane and mass control 16—17—18 is influenced only by its own inertia and is quite independent of the aileron control. Thus, the control is quite as positive and definite as can be desired, yet more promptly responsive and more rapid than other arrangements.

My invention is susceptible of many embodiments, especially in the embodiments of the various control devices and the differential through which they are connected. There are many known forms of each device. Accordingly, I do not wish to be limited to any specific forms of any devices. The attached claims are to be interpreted in the broad spirit of the generic invention. So too in the building of the system, those equivalent and supplemental expedients known to those skilled in the art are to be utilized wherever necessary.

What I claim as new and useful is:

1. In an aircraft, a lateral stabilizing system comprising air rush responsive devices at opposite lateral locations on the craft, differentially acting connections between them, a standard of position with respect to earth and differentially acting connections between the first named said connections and the said earth standard.

2. In an aircraft, a lateral stabilizing system comprising air rush responsive devices at opposite lateral locations on the craft, differentially acting connections between them, a standard of position with respect to earth, a device responsive to yawing of the craft co-acting with the earth standard, and differentially acting connections between the first named such connections and the last named two devices.

3. In an aircraft, a lateral stabilizing system comprising air rush responsive devices at opposite lateral locations on the craft, differentially acting connections between them, a standard of position with respect to earth and differentially acting connections between the first named said connections and the said earth standard, together with a servo motor controlled from said last named differential connections and having a follow up device operating therethrough to effect the extent of control thereby.

4. An aircraft comprising a main supporting member which constitutes the lifting body of the craft, a balancing device upon each side of said main supporting member and presenting differentially cooperating surfaces arranged to be normally continuously acted upon in flight by air pressure, to produce torques in opposite directions about the longitudinal axis of the craft, said balancing devices being connected to each other and each responsive to temporarily preponderating pressure thereon to increase the torque of the other, but differentially acted upon through gravity when the craft is unbalanced to further increase the torque, together with a vane also differentially connected with said balancing devices and acted upon by the air rush when the aeroplane develops lateral acceleration in a direction to move said devices to counteract said development.

5. An aircraft comprising a main supporting member which constitutes the lifting body of the craft, a balancing device upon each side of said main supporting member and presenting differentially cooperating surfaces arranged to be normally continuously acted upon in flight by air pressure to produce torques in opposite directions about the longitudinal axis of the craft, said balancing devices being connected to each other and each responsive to temporarily preponderating pressure thereon to increase the torque of the other, and a vane differentially connected with said balancing devices and acted upon by the air rush when the aeroplane develops lateral acceleration to move the balancing devices in a direction to decrease the lateral acceleration.

6. In a balancing system, a servo motor, a screw driven by the servo motor, a nut on the screw, a cable paralleling the screw and connected to balancing levers, an abutment connected with the cable and a pivoted arm establishing driving connection between the nut and the abutment and oscillatable about its pivot to make and break the driving connection.

7. In a balancing system, a servo motor, a screw driven by the servo motor, a nut on the screw, a cable paralleling the screw and connected to balancing levers, an abutment connected with the cable and a pivoted arm establishing driving connection between the nut and the abutment and oscillatable about its pivot to make and break the driving connection, which arm effects the connection through a two way ratcheting device.

In testimony whereof I hereunto affix my signature.

JOHN P. TARBOX.